United States Patent
Piestert et al.

(10) Patent No.: US 11,512,192 B2
(45) Date of Patent: Nov. 29, 2022

(54) THERMOPLASTIC COMPOSITION HAVING IMPROVED FLAME RETARDANT PROPERTIES

(71) Applicant: BYK-Chemie GmbH, Wesel (DE)

(72) Inventors: Frederik Piestert, Wesel (DE); Inno Rapthel, Wesel (DE); Thorsten Kröller, Wesel (DE); Jochen Wilms, Wesel (DE); Dennis Levering, Wesel (DE); Markus Borth, Wesel (DE); Hans-Jürgen Eichler, Wesel (DE); Patricia Oostendorp, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 359 days.

(21) Appl. No.: 16/771,319

(22) PCT Filed: Dec. 13, 2018

(86) PCT No.: PCT/EP2018/084824
§ 371 (c)(1),
(2) Date: Jun. 10, 2020

(87) PCT Pub. No.: WO2019/115723
PCT Pub. Date: Jun. 20, 2019

(65) Prior Publication Data
US 2020/0339793 A1    Oct. 29, 2020

(30) Foreign Application Priority Data
Dec. 15, 2017  (EP) ..................... 17207839

(51) Int. Cl.
| | | |
|---|---|---|
| *C08L 23/08* | (2006.01) | |
| *C08L 23/12* | (2006.01) | |
| *H01B 3/44* | (2006.01) | |
| *H01B 7/295* | (2006.01) | |

(52) U.S. Cl.
CPC ....... *C08L 23/0853* (2013.01); *C08L 23/0815* (2013.01); *C08L 23/12* (2013.01); *H01B 3/441* (2013.01); *H01B 3/442* (2013.01); *H01B 3/446* (2013.01); *H01B 3/447* (2013.01); *H01B 7/295* (2013.01); *C08L 2201/02* (2013.01); *C08L 2201/08* (2013.01); *C08L 2203/20* (2013.01); *C08L 2205/035* (2013.01); *C08L 2207/04* (2013.01); *C08L 2207/066* (2013.01)

(58) Field of Classification Search
CPC .. C08L 23/0853; C08L 23/0815; C08L 23/12; C08L 2201/02; C08L 2203/20; H01B 3/441; H01B 3/442; H01B 3/446; H01B 3/447; H01B 7/295
See application file for complete search history.

(56) References Cited

U.S. PATENT DOCUMENTS

| | | |
|---|---|---|
| 4,353,817 A | 10/1982 | Nakae et al. |
| 6,414,059 B1 | 7/2002 | Kobayashi et al. |
| 2005/0215661 A1 | 9/2005 | Vora |
| 2009/0238957 A1 | 9/2009 | Clancy |
| 2010/0209705 A1 | 8/2010 | Lin et al. |
| 2012/0128906 A1 | 5/2012 | Jackson et al. |
| 2016/0260524 A1 | 9/2016 | Clancy et al. |

FOREIGN PATENT DOCUMENTS

| | | |
|---|---|---|
| CN | 106397962 A | 2/2017 |
| EP | 0237713 A2 | 9/1987 |
| EP | 0280761 A2 | 9/1988 |
| EP | 0334205 A2 | 9/1989 |
| EP | 0474252 A2 | 3/1992 |
| EP | 0700962 A1 | 3/1996 |
| EP | 0821018 A2 | 1/1998 |
| EP | 2576694 B1 | 1/2015 |
| GB | 2151236 A | 7/1985 |
| JP | 2012177028 A | 9/2012 |
| JP | 2016020450 A | 2/2016 |
| WO | 200708765 A2 | 1/2007 |
| WO | 2013036573 A1 | 3/2013 |

OTHER PUBLICATIONS

International Search Report and Written Opinion for International Application No. PCT/EP2018/084824 dated Feb. 14, 2019 (11 pages).
International Preliminary Report on Patentability for International Application No. PCT/EP2018/084824 dated Mar. 26, 2020 (18 pages).

*Primary Examiner* — Catherine S Branch
(74) *Attorney, Agent, or Firm* — Fitch, Even, Tabin & Flannery LLP

(57) ABSTRACT

The invention relates to a composition comprising a) a thermoplastic matrix polymer based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned, b) an inorganic flame retardant, c) a polymer based on one or more ethylenically unsaturated polymerizable monomers and having a plurality of alkoxysilane and/or acetoxysilane groups covalently linked to the polymer, wherein the ethylenically unsaturated polymerizable monomers of component c) are different or have a different composition than the ethylenically unsaturated monomer(s) of component a) and d) a clay.

22 Claims, No Drawings

THERMOPLASTIC COMPOSITION HAVING IMPROVED FLAME RETARDANT PROPERTIES

The invention relates to a composition comprising a thermoplastic polymer based on one or more ethylenically unsaturated polymerizable monomer(s), an inorganic flame retardant, and a polymer based on one or more ethylenically unsaturated polymerizable monomers and having a plurality of alkoxysilane groups covalently linked to the polymer. The invention further relates to an electrical component comprising the composition as an insulator, to a process of improving the flame retardant properties of a composition, and to the use of a polymer based on one or more ethylenically unsaturated polymerizable monomers and having a plurality of alkoxysilane groups covalently linked to the polymer for improving the flame retardant properties.

EP 2576694 relates to compositions that are halogen-free, flame retardant, and comprise a thermoplastic polyurethane and a silane-grafted, crosslinked ethylene vinyl acetate copolymer. The examples demonstrate an improvement of heat deformation performance when substantial crosslinking is introduced in the silane-grafted ethylene vinyl acetate copolymer. An improvement of the flame retardant properties was not observed to be caused by silane-grafting or crosslinking.

WO 2007/008765 describes silane-grafted polyolefins and polyolefin blends. Further, it relates to adhesive formulations based on silane-grafted ethylene/a-olefin polymers. This document is silent about the use of silane-grafted polyolefins for improving flame retardant properties.

There is a need for thermoplastic polymer compositions based on ethylenically unsaturated polymerizable monomers having improved flame retardant properties. The present invention addresses this need. Such compositions are useful in many areas, in particular for manufacturing of insulating parts of electrical components.

The invention provides a composition comprising
a) a thermoplastic polymer based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned,
b) an inorganic flame retardant,
c) a polymer based on one or more ethylenically unsaturated polymerizable monomers, and having a plurality of alkoxysilane or acetoxysilane groups linked to the polymer, wherein the ethylenically unsaturated polymerizable monomers of component c) are different or have a different composition than the ethylenically unsaturated monomer(s) of component a) and if component a) is or comprises a copolymer of ethylene and vinyl acetate, the sum of the differences of the weight-% for each monomer type in the monomer compositions of component a) and component c) is at least 15 weight-% and
d) a clay.

This is calculated by determining the weight-% of each monomer type in the total monomer composition of component a) and the weight-% of each monomer type in the total monomer composition of component c), calculating the difference in weight-% for each individual monomer type in the monomer compositions of components a) and c), and summing the differences in in weight-%. For this calculation, any alkoxysilane- or acetoxysilane-functional monomers in component c) are disregarded.

It has been found that the compositions of the invention exhibit significant improvements in flame retardant properties, when compared to similar compositions without the polymer c) having alkoxysilane groups.

The composition comprises a thermoplastic polymer based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned.

Very suitable are polyethylene, polypropylene and copolymers of ethylene or propylene with other olefins, for example α-olefins, such as olefins having 4 to 20 carbon atoms. High-density, medium-density, and low-density polyethylene or polypropylene can be used. Copolymers of ethylene and vinyl acetate have also been found very suitable as thermoplastic polymer.

Likewise, hybrids and copolymers of different types of ethylenically unsaturated monomers may be used as thermoplastic polymer. The thermoplastic polymer generally does not contain alkoxysilane groups linked to the polymer. The thermoplastic polymer generally forms the matrix in which the other components of the composition are embedded.

It should be noted that the expression polyolefins relates to polymers of unsaturated hydrocarbons as such. Therefore, chlorinated polyolefins are not considered to fall within the general scope of polyolefins, in line with the general understanding of the skilled person.

Preferably, the thermoplastic polymer does not contain organic-chlorine compounds. More preferably, the thermoplastic polymer does not contain chlorinated polyolefins. The thermoplastic polymer is most preferably substantially free of chlorine compounds, i.e. no chlorine or chlorine compounds were intentionally added.

The composition of the invention further comprises an inorganic flame retardant. The inorganic flame retardant can be chosen from generally known inorganic materials which have a flame retardant effect in a polymer matrix. Examples of such inorganic flame retardants are metal oxides, metal hydroxides, metal carbonates, as well as phosphates and borates, or bismuth oxychloride.

Preferred inorganic flame retardants are aluminum trihydroxide (also known as ATH or aluminum trihydrate) and magnesium hydroxide (also known as magnesium dihydroxide or MDH).

These may be naturally occurring or synthetic, and they can be used alone or in combination with one another.

Specific examples of other inorganic compounds having flame retardant properties are calcium carbonate and silica.

An essential component of the composition is a polymer based on one or more ethylenically unsaturated polymerizable monomers and having a plurality of alkoxysilane or acetoxysilane groups linked to the polymer, and wherein the ethylenically unsaturated polymerizable monomers of component c) are different or have a different composition than the ethylenically unsaturated monomer(s) of component a). The polymer having a plurality of alkoxysilane groups may be selected from generally know types of polymers based on ethylenically unsaturated polymerizable monomers. Suitable types of polymers are typically thermoplastic polymers. Examples include polyolefins, such polyethylene and polypropylene, polystyrene and polyacrylates. Very suitable are polyethylene, polypropylene and copolymers of ethylene or propylene with other olefins, for example a-olefins, such as olefins having 4 to 20 carbon atoms. High-density, medium-density, and low-density polyethylene or polypropylene can be used. Copolymers of ethylene and/or propylene and vinyl acetate have also been found very suitable. Likewise, hybrids and copolymers of different types of ethylenically unsaturated monomers may be used. Component c) has a plurality of alkoxysilane or actetoxysilane groups linked to the polymer. Generally, the alkoxysilane or acetoxysilane groups are covalently linked to the polymer. Examples of suitable alkoxy groups are methoxy groups, ethoxy groups, and propoxy groups. Higher alkoxy groups having 4 to 10 carbon atoms can be used as well. In one embodiment, component c) is obtainable by copolymerizing at least one ethylenically unsaturated alkoxysilane functional monomer with other monomers. In a further embodiment, component c) is obtainable by grafting at least one ethylenically unsaturated alkoxysilane functional monomer to a polymer based on one or more ethylenically unsaturated polymerizable monomers.

Examples of suitable ethylenically unsaturated alkoxysilane functional monomers for both alternatives are those having a vinyl, allyl, isopropenyl, butenyl, cyclohexenyl or gamma-(meth)acryloxy allyl group and an alkoxysilane group, such as vinyl trimethoxy silane, vinyl triethoxy silane, vinyl triacetoxy silane, gamma-(meth)acryloxy propyl tri(m)ethoxy silane. It is also possible to use mixtures of these monomers. In some embodiments, it may be advantageous to include other, non-alkoxysilane functional monomers in the grafting process, for example acrylates, methacrylates or styrene.

Grafting is suitably carried out by combining the base polymer with an ethylenically unsaturated alkoxysilane functional monomer in the presence of a radical generating agent, such as a peroxide or an azo compound. Organic initiators are preferred, such dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide, dilauroyl peroxide, and tert-butyl peracetate. A suitable azo compound is 2,2-azobisisobutyronitrile. Grafting is suitably carried out at elevated temperature, in particular at a temperature that ensures generation of free radicals from the radical generating agent. In some embodiments, grafting is carried out below the melting temperature of the base polymer.

The amount of grafted or polymerized units of alkoxysilane functional monomers in component c) can be varied in a wide range. Generally, component c) comprises polymerized or grafted ethylenically unsaturated alkoxysilane functional monomers in the range of 0.1 to 10.0% by weight, preferably 0.2 to 6.0% by weight, and more preferably 0.3 to 5.0% by weight, calculated on the weight of component c).

As mentioned above, the ethylenically unsaturated polymerizable monomers of component c) are different or have a different composition than the ethylenically unsaturated monomer(s) of component a). In some embodiments, components a) and c) may be based on entirely different ethylenically unsaturated polymerizable monomers, such as ethylene and vinyl acetate for component a), and a silane grafted polypropylene for component c). In other embodiments, component a) and component c) may have one or more monomer types in common, provided that the ethylenically unsaturated polymerizable monomers of component c) have a different composition than the ethylenically unsaturated monomer(s) of component a). Generally, component c) comprises at least 10 mol-%, preferably at least 15 mol-%, more preferably between 20 and 100 mol-%, of polymerized unsaturated monomers which are different from the ethylenically unsaturated monomer(s) of component a). In embodiments wherein component a) comprises more than 1 thermoplastic matrix polymer, the overall monomer composition of the thermoplastic matrix polymers of component a) is taken into account for determining the difference between the monomer compositions of components a) and c).

A particularly beneficial effect of the invention is that component c) can be employed in relatively low amounts and still gives a significant improvement in fire retardant properties. Generally, component c) is present in the composition in the range of 0.1 to 10.0% by weight, preferably 0.5 to 7.0% by weight, calculated on the weight of component a)+b).

The composition further comprises a clay. Clays, which have been organically modified, for examples with quaternary ammonium salts, have been found very suitable for providing further improved fire retardant properties.

The compositions of the invention can be prepared by generally known methods, for example by mixing the components in the form of powders, and further treating the mixed components at elevated temperature under conditions of shear, for example in a kneader or in an extruder. The order of mixing or addition of the components is not critical for obtaining the desired result.

The compositions of the invention can comprise further additives and components. These components can be included in usual amounts and depending on the intended use of the composition. Examples of further additives are antioxidants, heat stabilizers, UV stabilizers, processing aids, and anti-foaming agents, in an amount of 0.01 to 5.00% by weight, calculated on the weight of the entire composition. Further examples of additives include additional flame retarding agents, colorants, pigments, fillers, and further polymeric or elastomeric components.

In a preferred embodiment, the composition comprises
  a) 20.0 to 60.0% by weight of one or more thermoplastic polymers based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned,
  b) 40.0 to 80.0% by weight of one or more inorganic flame retardants,
  c) 0.1 to 10.% by weight of a polymer based on one or more ethylenically unsaturated polymerizable monomers, and having a plurality of alkoxysilane and/or acetoxysilane groups linked to the polymer, wherein the one or more ethylenically unsaturated polymerizable monomers of component c) are different or have a different composition than the one or more ethylenically unsaturated monomer(s) of component a), and if component a) is or comprises a copolymer of ethylene and vinyl acetate, the sum of the differences of the weight-% for each monomer type in the monomer compositions of component a) and component c) is at least 15 weight-% and
  d) a clay.
wherein the % by weight of the components a), b, and c) are calculated based on the combined weight of components a) and b).

The compositions are very suitable for processing to form 3-dimensional objects having improved fire retardant properties. Processing can be carried out in usual equipment, for example in twin-screw extruders or by injection molding. Processing temperatures are usually above the melting temperature of the matrix polymer. The upper limit of the processing temperature is governed by the decomposition temperature of the components.

The invention further relates to an electrical component comprising an electrically conductive element and an electrical insulator, wherein the electrical insulator comprises or consists of the composition of the invention. In one embodiment, the electrical component is a cable comprising an electrically conductive core and an electrically insulating cable sheath.

In a further aspect, the invention relates to process of improving the flame retardant properties of a composition comprising a) a thermoplastic polymer based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned, b) an inorganic flame retardant and d) a clay, comprising the step of including in the composition a polymer c) based on one or more ethylenically unsaturated polymerizable monomers and having a plurality of alkoxysilane and/or acetoxysilane groups linked to the polymer c), and wherein the ethylenically unsaturated polymerizable monomers of component c) are different or have a different composition than the ethylenically unsaturated monomer(s) of component a).

The invention further relates to the use of a polymer based on one or more ethylenically unsaturated polymerizable monomers and having a plurality of alkoxysilane and/or acetoxysilane groups linked to the polymer for improving the flame retardant properties of a composition comprising a) a thermoplastic polymer based on one or more ethylenically unsaturated polymerizable monomer(s), wherein the thermoplastic polymer is selected from the group consisting of polyolefins, polystyrene, polyacrylates, ethylene-vinylacetate copolymer, and copolymers and blends of the aforementioned, b) an inorganic flame retardant and d) a clay.

EXAMPLES

Preparation of Polymers Having a Plurality of Alkoxysilane Groups Linked to it (Component C))

The following abbreviations for raw materials are used:

| Abbreviation | Description |
| --- | --- |
| SEBS 1 | Calprene H6110, MFI: 1.5 g/10 min (230° C./2.16 kg, ASTM 1238), Supplier: Dynasol Elastomers |
| PP 1 | Polypropylen, MFI: 4-5/10 min (230° C./2.16 kg, ISO 1133), Supplier: Borealis |
| EVA 1 | Copolymer of ethylene and vinylacetate (14% by weight of vinyl acetate), MFI: 3 g/10 min (190° C./2.16 kg, ISO 1133), Supplier: Innospec |
| HDPE 1 | High density polyethylene, MFI: 21.5 g/10 min (190° C./2.16 kg, ISO 1133), Supplier: Ineos |
| LLDPE 1 | Linear low density polyethylene, MFI: 50 g/10 min (190° C./2.16 kg, ASTM 1238), Supplier: Exxon Mobil |
| DLPO | Dilauroylperoxide |
| DPOC | Dicetyl Peroxidicarbonate |
| DHBP | 2,5-Dimethyl-2,5-Di(tert-butyl peroxi)hexane, |
| MEMO | 3-Methacryloxypropyltrimethoxysilan |
| VTMO | Vinyltrimethoxysilane |
| VTEO | Vinyltriethoxysilane |

General Procedure for Grafting 100 parts by weight (pbw) of polymer powder were placed in a stainless steel reactor with stirrer and temperature control. The indicated amount and type of peroxide was added to the reactor, stirring was started, and the reactor was purged with nitrogen, evacuated and purged with nitrogen to remove oxygen and moisture. The indicated amount and types of monomers were added, and the reactor was heated to 50° C. and purged with nitrogen for 5 minutes, and subsequently the temperature was further increased to the indicated reaction temperature during a period of 35 minutes. The reaction temperature was maintained for 60 minutes, while the stirrer speed was 250 to 500 min$^{-1}$. Subsequently, the stirrer speed was reduced to 120 min$^{-1}$ and any unreacted monomers were removed by purging with nitrogen for 1 hour. Then the reaction product was allowed to cool to room temperature. Table 1 summarizes the grafting procedures and products. The parts by weight (pbw) in Table 1 are calculated on 100 parts of polymer. The degree of grafting was determined gravimetrically by the weight gain of the polymer. The graft polymer was characterized by the melt volume rate (MVR).

TABLE 1

| Grafting experiment | Polymer | Monomers (pbw) | Peroxide (pbw) | reaction-temperature | Degree of grafting (% by weight) | MVR (ISO 1133) |
| --- | --- | --- | --- | --- | --- | --- |
| A | SEBS 1 | MEMO (3.0) Styrene (1.0) | DLPO (0.67) | 96° C. | 2.25 | 23 cm³/10 min (230° C./10 kg) |
| B | PP 1 | MEMO (3.0) Styrene (1.0) | DLPO (0.90) | 95° C. | 2.40 | 7.6 cm³/10 min (190° C./2.16 kg) |
| C | PP 1 | VTMO (5.0) Styrene (1.0) | DLPO (0.50) | 105° C. | 1.25 | 169 cm³/10 min (190° C./2.16 kg) |
| D | EVA 1 | VTEO (5.0) Styrene (3.0) | DHBP (0.50) | 75° C. | 1.50 | 13 cm³/10 min (190° C./2.16 kg) |
| E | HDPE 1 | MEMO (3.0) Styrene (1.0) | DLPO (0.50) | 100° C. | 2.15 | 65 cm³/10 min (190° C./2.16 kg) |
| F | HDPE 1 | VTMO (5.0) | DLPO (1.00) | 100° C. | 1.30 | 64 cm³/10 min (19 0° C./2.16 kg) |
| G | LLDPE 1 | MEMO (3.0) Styrene (1.0) | DLPO (0.80) | 95° C. | 2.64 | 55 cm³/10 min (190° C./2.16 kg) |

Use of Silane Grafted Polymers

To demonstrate the effectiveness of the silane grafted polymers as fire retardant additive agents, several inventive and comparative compositions were prepared according to the following general procedure. The following raw materials were used.

| Raw material | description |
|---|---|
| ATH | Aluminiumtrihydroxide, Matrinal OL-104 LEO ex Martinswerke |
| UL 00328 | Exxon Escorene UL 00328, copolymer of ethylene und vinyl acetate containing 28% by weight of vinyl acetate ex Exxon Mobil |
| LL 1001 XV | Low density polyethylene ex Exxon Mobil |
| Irganox 1010 | phenolic antioxidant ex BASF |
| RP 2016 | Polypropylene ex Lyondell Basell |
| Mg(OH)2 | Magnesiumhydroxide Magnefin H5 ex Martinswerke |
| Solumer 871 | Ethylene-Octene-Copolymer ex SKinnovation |
| SCONA TSPE 1112 GALL | Carboxylated polyethylene ex BYK-Chemie GmbH |
| Cloisite 5 | Layered silicate ex BYK-Chemie GmbH |
| Cloisite 20 | Layered silicate ex BYK-Chemie GmbH |

General Procedure for Preparing Polymer Compositions According to the Invention and Comparative Compositions Thermoplastic polymer powder was mixed with an antioxidant and a silane grafted polymer in the indicated amounts. This mixture was fed to a dosing balance of an extruder (model Coperion ZSK 18 K38). Inorganic flame retardant was fed to a side inlet of the extruder via a second dosing balance. Extrusion was carried out using the temperature profile detailed further below and at 300 rpm. The overall capacity of the extruder was 2 kg/h. The composition left the extruder via a slot die (dimensions 28 mm×3 mm) and was cooled.

Temperature profiles in the extruder from polymer entry funnel to slot die:

For polyethylene and ethylene vinyl acetate polymers:
130° C./150° C./160° C./155° C./160° C./170° C.

For polypropylene:
130° C./150° C./160° C./155° C./160° C./170° C.

Preparation of Test Specimen for Examples 1 to 66

The extruded strings were placed in a stainless steel frame of inner dimensions 15.0 cm×15.0 cm×3.2 mm. The string pieces were arranged to completely cover the lateral inner surface of the frame. The upper and lower surface of the frame were covered with a polyethylene foil. The frame was then placed in a pre-heated press having a temperature of the pressing tool of 170° C. to 190° C. The press was then closed for 60 seconds and subsequently pressure of 30 to 50 bar was applied for 60 seconds. Next, the steel frame was removed from press, and the upper polyethylene foil was removed and the pressed sample was removed from the steel frame and allowed to cool to room temperature. Test specimen of dimension 125 mm×13 mm×3.2 mm was punched form the pressed sample, and subsequently stored at a relative humidity of 45 to 55% and a temperature of 20 to 25° C. for 24 hours.

Preparation of Test Specimen for Examples 67 to 86

The extruded strings were granulated to particles having a size in the range of approximately 0.1 to 0.5 mm. Test specimen of dimension 125 mm×13 mm×3.2 mm were prepared by injection molding, and subsequently stored at a relative humidity of 45 to 55% and a temperature of 20 to 25° C. for 24 hours.

Test Procedure of Flame Retardant Properties

The flame retardant properties of test specimen were determined in a UL-94 fire chamber based on DIN EN 60695-11-10. The test specimen were secured in the sample holders of the UL-94 fire chamber. The burner upper surface was positioned 1 cm below the lower surface of the test specimen, the flame was positioned in a 45° angle and a heating output of 50 W. The test specimen were exposed to the flame for 10 seconds, before removing the flame. If the test specimen extinguished by itself within 10 seconds, the process was repeated until the sample burned or until 5 cycles were performed. For evaluation to the criteria summarized in the table below were used. Test specimen which exhibited fire retardant properties below rating V 2 according to DIN EN 60695-11-10 were marked as F. This rating was added to better distinguish the properties. It is not part of DIN EN 60695-11-10.

| | Rating of fire retardant properties | | | |
|---|---|---|---|---|
| criteria | F | V 0 | V 1 | V 2 |
| Time to extinction of flame of single test specimen | >30 s | ≤10 s | ≤30 s | ≤30 s |
| Accumulated time to extinction of flame of 5 test specimen | >250 s | ≤50 s | ≤250 s | ≤250 s |
| Time to extinction of flame plus smoldering time of single test specimen after the second flame cycle | >60 s | ≤30 s | ≤60 s | ≤60 s |
| Falling droplets or particles | yes | no | no | yes |
| Ignition of the cotton underlay by burning particles | yes | no | no | yes |

The results are summarized in the tables below. Comparative Examples are marked with an *.

| Example | Thermoplastic Polymer (amount in pbw) | Inorganic flame retardant (amount in pbw) | Silane grafted polymer in pbw | Silane grafted polymer example | Stabilizer Irganox 1010 in pbw | rating UL 94 |
|---|---|---|---|---|---|---|
| 1* | UL 00328 (32.5) LL 1001 XV (6.2) | ATH (61) | — | — | 0.3 | F |
| 2* | UL 00328 (30.8) LL 1001 XV (5.9) | ATH (63) | — | — | 0.3 | F |
| 3* | UL 00328 (29.1) LL 1001 XV (5.6) | ATH (65) | — | — | 0.3 | F |
| 4* | UL 00328 (29.1) LL 1001 XV (5.6) | ATH (61) | 6.2 | D | 0.3 | F |
| 5 | UL 00328 (29.9) LL 1001 XV (5.7) | ATH (61) | 3.1 | B | 0.3 | V2 |
| 6 | UL 00328 (27.3) 1001 XV (5.2) | ATH (61) | 6.2 | B | 0.3 | V2 |
| 7 | UL 00328 (28.2) LL 1001 XV (5.4) | ATH (63) | 3.1 | C | 0.3 | V2 |
| 8 | UL 00328 (25.6) LL 1001 XV (4.9) | ATH (63) | 6.2 | C | 0.3 | V1 |

| Example | Thermoplastic Polymer (amount in pbw) | Inorganic flame retardant (amount in pbw) | Silane grafted polymer in pbw | Silane grafted polymer example | Stabilizer Irganox 1010 in pbw | rating UL 94 |
|---|---|---|---|---|---|---|
| 9 | UL 00328 (26.5) LL 1001 XV (5.1) | ATH (65) | 3.1 | B | 0.3 | V1 |
| 10 | UL 00328 (23.9) LL 1001 XV (4.7) | ATH (65) | 6.2 | B | 0.3 | V0 |
| 11 | UL 00328 (29.9) LL 1001 XV (5.7) | ATH (61) | 3.1 | A | 0.3 | V1 |
| 12 | UL 00328 (27.3) LL1001 XV (5.2) | ATH (61) | 6.2 | A | 0.3 | V1 |
| 13 | UL 00328 (28.2) 1001 XV (5.4) | ATH (63) | 3.1 | A | 0.3 | V2 |
| 14 | UL 00328 (25.6) 1001 XV (4.9) | ATH (63) | 6.2 | A | 0.3 | V1 |
| 15 | UL 00328 (26.5) LL 1001 XV (5.1) | ATH (65) | 3.1 | A | 0.3 | V1 |
| 16 | UL 00328 (23.9) LL 1001 XV (4.7) | ATH (65) | 6.2 | A | 0.3 | V0 |
| 17 | UL 00328 (27.3) LL 1001 XV (5.2) | ATH (61) | 6.2 | G | 0.3 | V2 |
| 18 | UL 00328 (25.6) LL 1001 XV (4.9) | ATH (63) | 6.2 | G | 0.3 | V2 |
| 19 | UL 00328 (26.6) LL 1001 XV (5.1) | ATH (65) | 3.1 | G | 0.3 | V2 |
| 20 | UL 00328 (23.9) LL 1001 XV (4.7) | ATH (65) | 6.2 | G | 0.3 | V2 |
| 21 | UL 00328 (29.9) LL 1001 XV (5.7) | ATH (61) | 3.1 | F | 0.3 | V2 |
| 22 | UL 00328 (27.3) 1001 XV (5.2) | ATH (61) | 6.2 | F | 0.3 | V2 |
| 23 | UL 00328 (28.2) 1001 XV (5.4) | ATH (63) | 3.1 | E | 0.3 | V2 |
| 24 | UL 00328 (25.6) LL 1001 XV (4.9) | ATH (63) | 6.2 | E | 0.3 | V2 |
| 25 | UL 00328 (26.5) LL 1001 XV (5.1) | ATH (65) | 3.1 | E | 0.3 | V2 |
| 26 | UL 00328 (29.9) 1001 XV (4.7) | ATH (65) | 6.2 | E | 0.3 | V2 |

It can be concluded that the addition of silane-functional polymers significantly improves the flame retardant properties of the compositions according to the invention. Comparative Example 4 demonstrates that the improvement is not present when the thermoplastic matrix polymer and the silane functional polymer are based on the same monomers.

| Example | Thermoplastic polymer (amount in pbw) | Inorganic flame retardant (pbw) | Silane grafted polymer in pbw | Silane grafted polymer example | Clay Cloisite 20 in pbw | Stabilizer Irganox 1010 in pbw | Rating UL 94 |
|---|---|---|---|---|---|---|---|
| 27* | UL 00328 (32.0) LL 1001 XV (6.2) | ATH (61) | — | — | 0.5 | 0.3 | V2 |
| 28* | UL 00328 (30.5) LL 1001 XV (5.7) | ATH (63) | — | — | 0.5 | 0.3 | V2 |
| 29 | UL 00328 (29.6) LL 1001 XV (5.5) | ATH (61) | 3.1 | B | 0.5 | 0.3 | V0 |
| 30 | UL 00328 (27.0) LL 1001 XV (5.0) | ATH (61) | 6.2 | B | 0.5 | 0.3 | V0 |
| 31 | UL 00328 (27.9) LL 1001 XV (5.2) | ATH (63) | 3.1 | B | 0.5 | 0.3 | V0 |
| 32 | UL 00328 (25.3) LL 1001 XV (4.7) | ATH (63) | 6.2 | B | 0.5 | 0.3 | V0 |
| 33 | UL 00328 (29.6) LL 1001 XV (5.5) | ATH (61) | 3.1 | A | 0.5 | 0.3 | V0 |
| 34 | UL 00328 (27.0) LL 1001 XV (5.0) | ATH (61) | 6.2 | A | 0.5 | 0.3 | V0 |
| 35 | UL 00328 (27.9) LL 1001 XV (5.2) | ATH (63) | 3.1 | A | 0.5 | 0.3 | V0 |
| 36 | UL 00328 (25.3) 1001 XV (4.7) | ATH (63) | 6.2 | A | 0.5 | 0.3 | V0 |
| 37 | UL 00328 (29.6) LL 1001 XV (5.5) | ATH (61) | 3.1 | G | 0.5 | 0.3 | V1 |
| 38 | UL 00328 (27.0) LL 1001 XV (5.0) | ATH (61) | 6.2 | G | 0.5 | 0.3 | V1 |
| 39 | UL 00328 (27.9) LL 1001 XV (5.2) | ATH (63) | 3.1 | G | 0.5 | 0.3 | V1 |
| 40 | UL 00328 (25.3) 1001 XV (4.7) | ATH (63) | 6.2 | G | 0.5 | 0.3 | V1 |
| 41 | UL 00328 (29.6) LL 1001 XV (5.5) | ATH (61) | 3.1 | E | 0.5 | 0.3 | V1 |
| 42 | UL 00328 (27.0) LL 1001 XV (5.0) | ATH (61) | 6.2 | E | 0.5 | 0.3 | V1 |
| 43 | UL 00328 (27.9) 1001 XV (5.2) | ATH (63) | 3.1 | E | 0.5 | 0.3 | V1 |
| 43 | UL 00328 (25.3) 1001 XV (4.7) | ATH (63) | 6.2 | E | 0.5 | 0.3 | V1 |

-continued

| Example | Thermoplastic polymer (pbw) | Inorganic flame retardant (pbw) | Silane grafted polymer in pbw | Silane grafted polymer example | Stabilizer Irganox 1010 (pbw) | Rating UL 94 |
|---|---|---|---|---|---|---|
| 45* | Solumer 871 (29.8) TSPE 1112 GALL (4.9) | ATH (65) | — | — | 0.3 | F |
| 46 | Solumer 871 (26.8) TSPE 1112 GALL (4.8) | ATH (65) | 3.1 | C | 0.3 | V1 |
| 47 | Solumer 871 (24.5) TSPE 1112 GALL (4.0) | ATH (65) | 6.2 | C | 0.3 | V0 |
| 48 | Solumer 871 (26.8) TSPE 1112 GALL (4.8) | ATH (65) | 3.1 | A | 0.3 | V2 |
| 49 | Solumer 871 (24.5) TSPE 1112 GALL (4.0) | ATH (65) | 6.2 | A | 0.3 | V1 |
| 50 | Solumer 871 (26.8) TSPE 1112 GALL (4.8) | ATH (65) | 3.1 | G | 0.3 | V2 |
| 51 | Solumer 871 (24.5) TSPE 1112 GALL (4.0) | ATH (65) | 6.2 | G | 0.3 | V1 |
| 52 | Solumer 871 (26.8) TSPE 1112 GALL (4.8) | ATH (65) | 3.1 | F | 0.3 | V2 |
| 53 | Solumer 871 (24.5) TSPE 1112 GALL (4.0) | ATH (65) | 6.2 | F | 0.3 | V1 |
| 54 | Solumer 871 (26.8) TSPE 1112 GALL (4.8) | ATH (65) | 3.1 | D | 0.3 | V2 |
| 55 | Solumer 871 (24.5) TSPE 1112 GALL (4.0) | ATH (65) | 6.2 | D | 0.3 | V1 |

| Composition | Thermoplastic polymer (amount in pbw) | Inorganic flame retardant (pbw) | Silane grafted polymer in pbw | Silane grafted polymer example | Clay Cloisite 5 in pbw | Stabilizer Irganox 1010 (pbw) | Rating UL 94 |
|---|---|---|---|---|---|---|---|
| 56* | Solumer 871 (29.8) TSPE 1112 GALL (4.9) | ATH (65) | — | — | 0.5 | 0.3 | F |
| 57 | Solumer 871 (26.5) TSPE 1112 GALL (4.6) | ATH (65) | 3.1 | C | 0.5 | 0.3 | V0 |
| 58 | Solumer 871 (24.2) TSPE 1112G ALL (3.8) | ATH (65) | 6.2 | C | 0.5 | 0.3 | V0 |
| 59 | Solumer 871 (26.5) TSPE 1112 GALL (4.6) | ATH (65) | 3.1 | A | 0.5 | 0.3 | V1 |
| 60 | Solumer 871 (24.5) TSPE 1112 GALL (3.8) | ATH (65) | 6.2 | A | 0.5 | 0.3 | V0 |
| 61 | Solumer 871 (26.5) TSPE 1112 GALL (4.6) | ATH (65) | 3.1 | G | 0.5 | 0.3 | V2 |
| 62 | Solumer 871 (24.2) TSPE 1112 GALL (3.8) | ATH (65) | 6.2 | G | 0.5 | 0.3 | V1 |
| 63 | Solumer 871 (26.5) TSPE 1112 GALL (4.6) | ATH (65) | 3.1 | F | 0.5 | 0.3 | V2 |
| 64 | Solumer 871 (24.2) TSPE 1112 GALL (3.8) | ATH (65) | 6.2 | F | 0.5 | 0.3 | V1 |
| 65 | Solumer 871 (26.5) TSPE 1112 GALL (4.6) | ATH (65) | 3.1 | D | 0.5 | 0.3 | V1 |
| 66 | Solumer 871 (24.5) TSPE 1112 GALL (3.8) | ATH (65) | 6.2 | D | 0.5 | 0.3 | V1 |

| Composition | Thermoplastic polymer (pbw) | Inorganic flame retardant (pbw) | Silane grafted polymer in pbw | Silane grafted polymer example | Stabilizer Irganox 1010 pbw | Rating UL 94 |
|---|---|---|---|---|---|---|
| 67* | RP 2016 (41.0) | Mg(OH)2 (59) | — | — | 0.3 | F |
| 68* | RP 2016 (37.7) | Mg(OH)2 (62) | — | — | 0.3 | V2 |
| 69 | RP 2016 (37.6) | Mg(OH)2 (59) | 3.1 | A | 0.3 | V2 |
| 70 | RP 2016 (34.6) | Mg(OH)2 (62) | 3.1 | A | 0.3 | V1 |
| 71 | RP 2016 (37.6) | Mg(OH)2 (59) | 3.1 | G | 0.3 | V0 |
| 72 | RP 2016 (34.6) | Mg(OH)2 (62) | 3.1 | G | 0.3 | V0 |
| 73 | RP 2016 (37.6) | Mg(OH)2 (59) | 3.1 | E | 0.3 | V2 |
| 74 | RP 2016 (34.6) | Mg(OH)2 (62) | 3.1 | E | 0.3 | V1 |
| 75 | RP 2016 (34.6) | Mg(OH)2 (62) | 3.1 | D | 0.3 | V1 |
| 76 | RP 2016 (34.6) | Mg(OH)2 (62) | 3.1 | D | 0.3 | V0 |

The invention claimed is:

1. A process of preparing a thermoplastic polymer composition, the process comprising:
   blending a) a thermoplastic polymer, b) an inorganic flame retardant, c) a polymer, and d) a clay,
   the thermoplastic polymer a) being based on one or more ethylenically unsaturated polymerizable monomers, the thermoplastic polymer a) including one or more of a polyolefin, a polystyrene, a polyacrylate, an ethylene-vinylacetate copolymer, and copolymers of the aforementioned, and wherein the thermoplastic polymer a) does not contain alkoxysilane groups,
   the polymer c) having been obtained by grafting one or more of an ethylenically unsaturated alkoxysilane functional monomer and an ethylenically unsaturated acetoxysilane functional monomer to a polymer based on one or more ethylenically unsaturated polymerizable monomers, and
   the polymer c) improving the flame retardant properties of the thermoplastic polymer composition.

2. The process according to claim 1 wherein the one or more ethylenically unsaturated polymerizable monomers of the polymer c) are different from the one or more ethylenically unsaturated monomers of the thermoplastic polymer a), and if thermoplastic polymer a) comprises the ethylene-vinylacetate copolymer, the sum of the differences of the weight-% for each monomer type in the monomer compositions of thermoplastic polymer a) and polymer c) is at least 15 weight %.

3. The process according to claim 1, wherein the inorganic flame retardant b) includes one or more of aluminum trihydroxide and magnesium dihydroxide.

4. The process according to claim 1, wherein at least 15 mol-% of the one or more ethylenically unsaturated polymerizable monomers on which polymer c) is based are different from the one or more ethylenically unsaturated polymerizable monomers on which thermoplastic polymer a) is based.

5. The process according to claim 1, wherein-the polymer c) is included in an amount in the range of 0.1 to 10.0% by weight, calculated on the total weight of thermoplastic polymer a) and the inorganic flame retardant b).

6. The process according to claim 1, wherein the polymer c) comprises the grafted one or more of the ethylenically unsaturated alkoxysilane functional monomer and the ethylenically unsaturated acetoxysilane functional monomer in an amount in the range of 0.1 to 10.0% by weight, calculated on the weight of polymer c).

7. The process according to claim 1, wherein-the thermoplastic polymer a) includes one or more of polyethylene, polypropylene, a copolymer of ethylene with another olefin, and a copolymer of propylene with another olefin.

8. An electrical component comprising an electrically conductive element and an electrical insulator, wherein the electrical insulator comprises a composition, the composition-comprising:
   a) thermoplastic polymer based on one or more ethylenically unsaturated polymerizable monomers, the thermoplastic polymer a) including one or more of a polyolefin, a polystyrene, a polyacrylate, an ethylene vinylacetate copolymer, and copolymers of the aforementioned, and wherein the thermoplastic polymer a) does not contain alkoxysilane groups,
   b) an inorganic flame retardant,
   c) a polymer based on one or more ethylenically unsaturated polymerizable monomers, and the polymer c) having been obtained by grafting at least one ethylenically unsaturated alkoxysilane and/or acetoxysilane functional monomer to a polymer based on one or more ethylenically unsaturated polymerizable monomers, the polymer c) improving the flame retardant properties of the thermoplastic polymer composition, and
   d) a clay.

9. The electrical component according to claim 8, wherein the electrical component is a cable comprising an electrically conductive core and an electrically insulating cable.

10. A composition comprising
    a) a thermoplastic polymer based on one or more ethylenically unsaturated polymerizable monomers, the thermoplastic polymer a) including one or more of a polyolefin, a polystyrene, a polyacrylate, an ethylene-vinylacetate copolymer, and copolymers of the aforementioned, and wherein the thermoplastic polymer a) does not contain alkoxysilane groups,
    b) an inorganic flame retardant,
    c) a polymer based on one or more ethylenically unsaturated polymerizable monomers, the polymer c) including a plurality of one or more of alkoxysilane groups and acetoxysilane groups, and having been obtained by grafting at least one ethylenically unsaturated alkoxysilane and/or acetoxysilane functional monomer to a polymer based on one or more ethylenically unsaturated polymerizable monomers, wherein the one or more ethylenically unsaturated polymerizable monomers on which polymer c) is based are different from the one or more ethylenically unsaturated-monomers on which thermoplastic polymer a) is based, and if thermoplastic polymer a) comprises the ethylene-vinylacetate copolymer, the sum of the differences of the weight-% for each monomer type in the monomer compositions of thermoplastic polymer a) and polymer c) is at least 15 weight-%, the polymer c) improving the flame retardant properties of the thermoplastic polymer composition, and
    d) a clay.

11. The process according to claim 1, wherein the polymer c) is included in an amount in the range of 0.5 to 7.0% by weight, calculated on the total weight of thermoplastic polymer a) and the inorganic flame retardant b).

12. The process according to claim 1, wherein the polymer c) comprises the grafted one or more of the ethylenically unsaturated alkoxysilane functional monomer and the ethylenically unsaturated acetoxysilane functional monomer in an amount in the range of 0.2 to 6.0% by weight, calculated on the weight of polymer c).

13. The process according to claim 1, wherein the polymer c) comprises the grafted one or more of the ethylenically unsaturated alkoxysilane functional monomer and the ethylenically unsaturated acetoxysilane functional monomer in an amount in the range of 0.3 to 5.0% by weight, calculated on the weight of polymer c).

14. A composition comprising:
    a) a thermoplastic polymer comprising one or more of a polyolefin, a polystyrene, a polyacrylate, an ethylene-vinylacetate copolymer, and copolymers thereof, the thermoplastic polymer a) not containing alkoxysilane groups,
    b) an inorganic flame retardant,
    c) a polymer including a structure formed from a material comprising ethylenically unsaturated monomers and having been obtained by grafting one or more of ethylenically unsaturated alkoxysilane functional monomers and acetoxysilane functional monomers to a polymer based on one or more ethylenically unsaturated polymerizable monomers, wherein the polymer c) is included in the range of 0.5 to 7.0% by weight, calculated on the total weight of thermoplastic polymer a) and the inorganic flame retardant b), the polymer c) improving flame the retardant properties of the thermoplastic polymer composition, and d) a clay.

15. The composition according to claim 14, wherein at least 15 mol-% of the ethylenically unsaturated polymerizable monomers used to form the structure of polymer c) are different from the ethylenically unsaturated monomers used to form the structure of thermoplastic polymer a).

16. The process according to claim 1, wherein the thermoplastic polymer a) comprises an ethylene-vinylacetate copolymer.

17. The process according to claim 1, wherein the thermoplastic polymer a) comprises an ethylene-vinylacetate copolymer and a polyolefin.

18. The process according to claim 1, the polymer c) having been obtained by grafting an ethylenically unsaturated alkoxysilane functional monomer to a polymer based on one or more ethylenically unsaturated polymerizable monomers.

19. The process according to claim 1, the polymer c) having been obtained by grafting both an ethylenically unsaturated alkoxysilane functional monomer and an ethylenically unsaturated acetoxysilane functional monomer to a polymer based on one or more ethylenically unsaturated polymerizable monomers.

20. The process according to claim 7, wherein the thermoplastic polymer a) includes polyethylene and not a polyacrylate.

21. The composition according to claim 10, wherein the thermoplastic polymer a) includes polypropylene.

22. The composition according to claim 14, wherein the thermoplastic polymer comprises a polyolefin.

* * * * *